Figure 2:
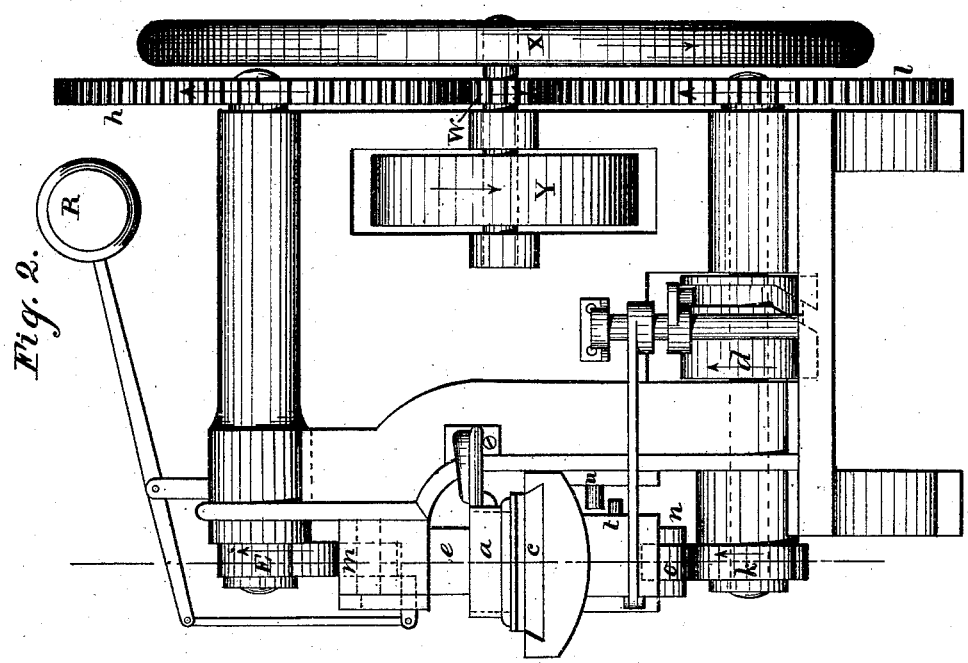
Figure 1:
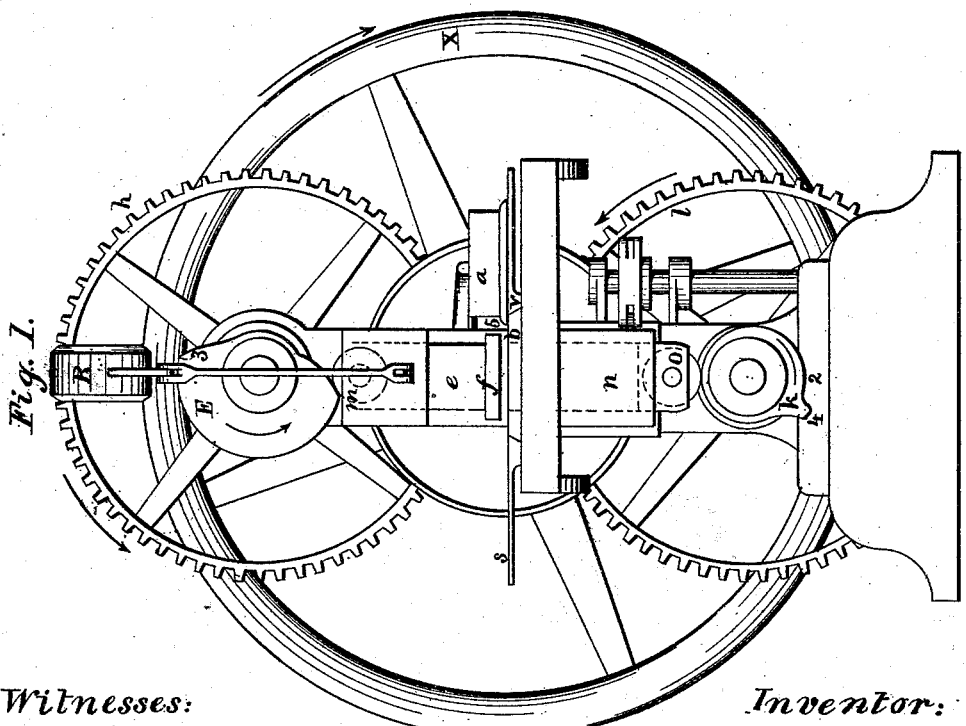

G. A. STANBERY.
MANUFACTURE OF FLOORING TILES.

No. 177,969. Patented May 30, 1876.

2 Sheets—Sheet 1.

Witnesses:
Chas S Diffinbaugh
Bernard Howsen

Inventor:
George A. Stanbery.

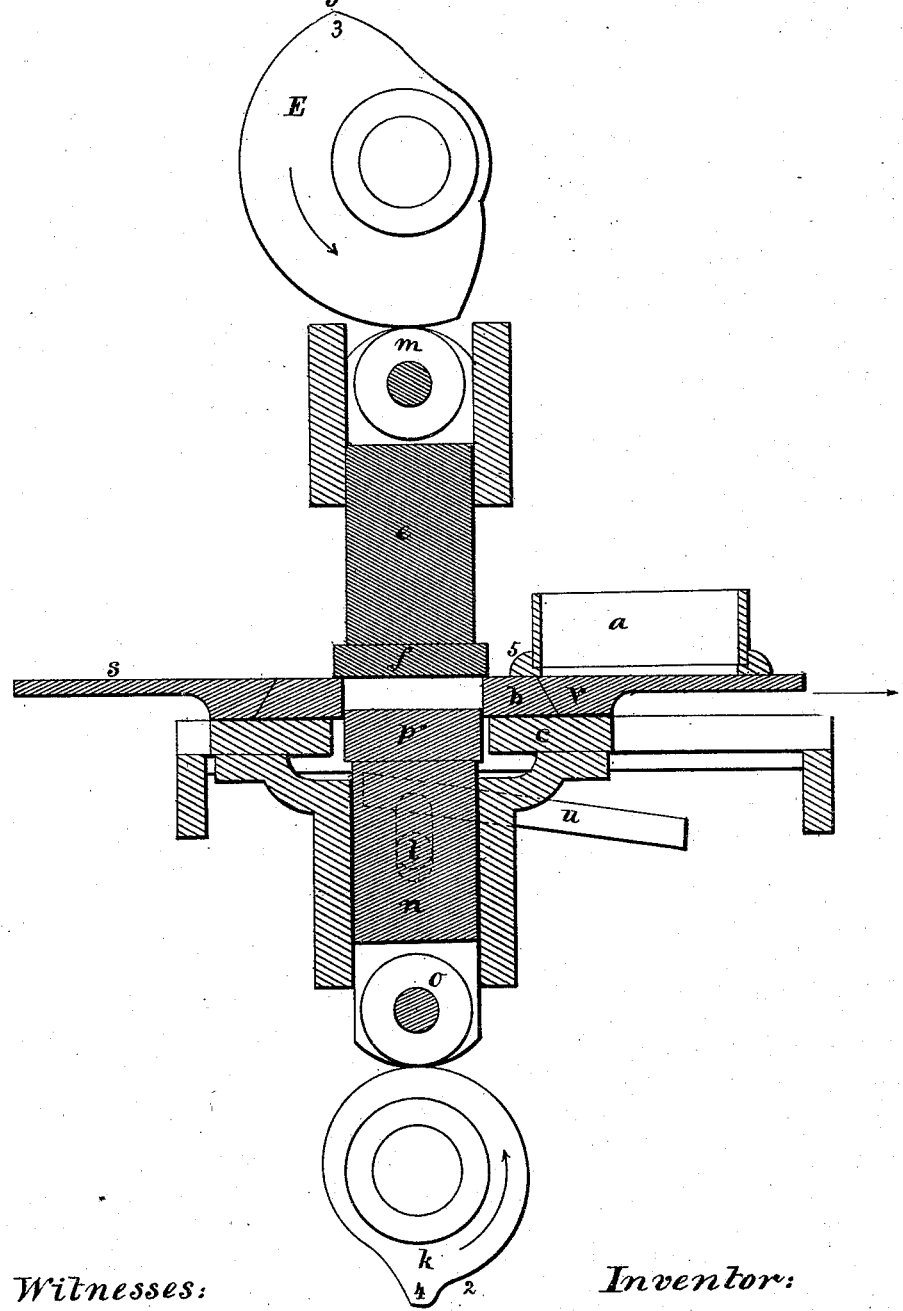

UNITED STATES PATENT OFFICE.

GEORGE A. STANBERY, OF ZANESVILLE, OHIO.

IMPROVEMENT IN THE MANUFACTURE OF FLOORING-TILES.

Specification forming part of Letters Patent No. 177,969, dated May 30, 1876; application filed March 8, 1876.

*To all whom it may concern:*

Be it known that I, GEORGE A. STANBERY, of Zanesville, Ohio, have invented an Improvement in the Manufacture of Flooring-Tile, of which the following is a specification:

This machine is designed to manufacture tile or brick out of clay that has been ground up fine or pulverized, and in that state pressed dry or semi-dry into the tile. The pulverized clay is placed in the hopper $a$. The machine is then ready to start. The side-draft cam $d$ moves the die $b$, which is fastened to the sliding table $c$, under the hopper $a$, so that the die receives a charge of clay. The side-draft cam $d$ then takes the die $b$ back to its place of rest under the top plunger $e$. As soon as it reaches this point the top plunger $e$, which has the platen $f$ fastened to its lower end, is forced down on top of the die by the revolving cam E, which closes the top of the die. The platen $f$ is larger than the opening in the die, so that it is perfectly closed. The plunger $e$ now remains stationary, while the part of the cam E which is a true circle revolves over the roller $m$, which is fastened in the end of the top plunger $e$.

While the platen $f$ is down and stationary, the cam $k$ starts to push up the lower plunger $n$ by pushing against the roller $o$. The plunger $n$ has the punch $p''$ fastened to its top end. This punch fits in the die $b$ and forms its bottom. The raising of the punch $p''$ by the revolving cam $k$ compresses the clay, so that when the place marked 2 on the cam $k$ has reached the roller $o$, the tile is of the right thickness. When the cam $k$ has reached this point the top cam E has revolved so that the point marked 3 on it has reached the roller $m$, which relieves the plunger $e$ and platen $f$, and allows the weight R to raise them off of the die $b$. The point marked 4 on the cam $k$ now strikes the plunger $n$, which raises the tile clear out of the die $b$. The side-draft cam $d$ now commences to move the sliding table $c$ and die $b$ out from under the hopper $a$ to receive a fresh charge of clay, and by so doing brings the pressed tile, which is resting on top of the punch $p''$, in contact with the edge of the hopper $a$, (marked 5,) which shoves the tile off of the punch $p''$ onto the table $s$; and as the die $b$ goes under the hopper $a$ to receive a fresh charge of clay, the punch $p''$ is drawn down to its place by the pin $t$, which is fastened into the plunger $n$, coming in contact with the inclined plane $u$. This inclined plane is adjustable, so that the punch can be drawn more or less to suit different charges of clay. The side-draft cam $d$ again moves the die to its place of rest under the platen $f$ to be pressed, and the tile which has just been pressed lies on the table $s$, ready to be removed. As the die moves out from under the hopper the table $v$ closes it, so that no clay can escape.

The cams E, $k$, and $d$ are revolved by the gear-wheels $h$ and $l$. They both gear into the pinion W, which has the band-wheel Y and balance-wheel X fastened on the same shaft with it.

Dies and punches of different forms can be used to produce different-shaped tile.

What I claim as my invention, and desire to secure by Letters Patent, is—

The machine as described, having its platen flat and larger than the opening in the die, and a movable punch or bottom fitting within the die, to which power is applied for compressing the pulverized clay in a dry or semi-dry state, for the purpose of preparing tile, substantially as set forth.

GEORGE A. STANBERY.

Witnesses:
CHAS. S. DEFFINBAUGH,
BERNARD HOWSON.